(12) United States Patent
Boling et al.

(10) Patent No.: US 8,159,202 B2
(45) Date of Patent: Apr. 17, 2012

(54) QUASI-CONTINUOUS VOLTAGE REGULATOR WITH DUAL POLARITY OUTPUTS

(75) Inventors: Brian Dean Boling, Broomfield, CO (US); Michael Ernest Dickeson, Westminster, CO (US); David Michael Freson, Loveland, CO (US); Tuan Van Tran, Brighton, CO (US)

(73) Assignee: Seagate Technology LLC, Cupertino, CA (US)

( * ) Notice: Subject to any disclaimer, the term of this patent is extended or adjusted under 35 U.S.C. 154(b) by 394 days.

(21) Appl. No.: 12/489,067

(22) Filed: Jun. 22, 2009

(65) Prior Publication Data

US 2010/0320975 A1 Dec. 23, 2010

(51) Int. Cl.
 *G05F 1/40* (2006.01)
(52) U.S. Cl. ............................ 323/284; 323/267; 363/98
(58) Field of Classification Search .................. 323/222, 323/282–290, 268, 344, 351, 272, 267; 363/41, 363/89, 98, 127, 21.06, 21.14
 See application file for complete search history.

(56) References Cited

U.S. PATENT DOCUMENTS

| | | | | |
|---|---|---|---|---|
| 4,884,183 A * | 11/1989 | Sable | | 363/41 |
| 5,402,060 A * | 3/1995 | Erisman | | 323/268 |
| 5,412,308 A * | 5/1995 | Brown | | 323/267 |
| 5,457,624 A * | 10/1995 | Hastings | | 363/127 |
| 6,275,016 B1 | 8/2001 | Ivanov | | 323/224 |
| 6,348,780 B1 | 2/2002 | Grant | | 323/222 |
| 6,377,034 B1 | 4/2002 | Ivanov | | 323/287 |
| 6,522,110 B1 | 2/2003 | Ivanov | | 323/267 |
| 6,628,109 B2 | 9/2003 | Rincon-Mora | | 323/282 |
| 6,853,174 B1 * | 2/2005 | Inn | | 323/285 |
| 7,030,596 B1 * | 4/2006 | Salerno et al. | | 323/282 |
| 7,061,214 B2 | 6/2006 | Mayega et al. | | 323/267 |
| 7,151,361 B2 | 12/2006 | Xi | | 323/222 |
| 7,224,085 B2 | 5/2007 | Chen et al. | | 307/82 |
| 7,276,886 B2 * | 10/2007 | Kinder et al. | | 323/267 |
| 7,391,195 B2 | 6/2008 | Tiew et al. | | 323/283 |
| 7,394,231 B2 * | 7/2008 | Flatness et al. | | 323/259 |
| 7,812,585 B2 * | 10/2010 | Zhou et al. | | 323/284 |
| 2003/0048098 A1 | 3/2003 | Tran | | 323/288 |
| 2007/0085523 A1 | 4/2007 | Scoones et al. | | 323/314 |
| 2008/0067993 A1 | 3/2008 | Coleman | | 323/282 |

* cited by examiner

*Primary Examiner* — Rajnikant Patel
(74) *Attorney, Agent, or Firm* — Alan G. Rego; Westman, Champlin & Kelly, P.A.

(57) ABSTRACT

A controller includes a hysteretic circuit that provides a first ON level pulse when a corresponding first negative regulated voltage rises above a respective first voltage threshold. Similarly, a second ON level pulse is provided when a corresponding second positive regulated voltage falls below a respective second voltage threshold. The hysteretic circuit provides an OFF level pulse when one of first and second switch currents increases above a current threshold. A switch control circuit receives the first and second ON level pulses and the OFF level pulse, and provides first and second switch control outputs to separately regulate the first and second regulated voltages.

20 Claims, 14 Drawing Sheets

QUASI-CONTINUOUS VOLTAGE REGULATOR WITH DUAL POLARITY OUTPUTS

CROSS-REFERENCE TO RELATED APPLICATION

Reference is made to U.S. patent application Ser. No. 12/489,052, filed on Jun. 22, 2009, titled "QUASI-CONTINUOUS VOLTAGE REGULATOR AND CONTROLLER", for inventors Brian Boling et al., the content of which is hereby incorporated by reference.

BACKGROUND

In data storage devices, buck-boost regulators are often utilized to generate negative preamp bias voltage. Fixed frequency regulators operating discontinuous conduction mode have historically been the solution of choice, as their design and operating characteristics are well understood within the data storage device industry. However, such implementations suffer from important shortcomings. In these discontinuous conduction mode regulators, stability requires careful control loop design, particularly at the higher loop bandwidths often necessary to achieve acceptable transient performance. Even these high bandwidth solutions provide, at best, modest transient response. Further, operating in discontinuous conduction mode necessitates relatively high peak inductor current to ensure regulator output power requirements are met.

Embodiments of the present invention provide solutions to these and other problems, and offer other advantages over the prior art.

SUMMARY OF THE INVENTION

In the embodiments described below, a controller includes a hysteretic circuit that provides a first ON level pulse when a corresponding first negative regulated voltage rises above a respective first voltage threshold. A second ON level pulse is generated when a second positive regulated voltage falls below a respective second voltage threshold. The hysteretic circuit provides an OFF level pulse when one of first and second switch currents increases above a current threshold. A switch control circuit receives the first and second ON level pulses and the OFF level pulse, and provides first and second switch control outputs to separately regulate the first and second regulated voltages.

According to one aspect, an output circuit provides first and second regulated voltages having opposite polarities. The output circuit comprises first and second switches that switch a supply voltage to an inductor in the output circuit.

Other features and benefits that characterize embodiments of the present invention will be apparent upon reading the following detailed description and review of the associated drawings.

DETAILED DESCRIPTION

Unless otherwise indicated either explicitly or by context, all voltages mentioned are measured with reference to a DC common conductor. Unless otherwise indicated either explicitly or by context, various "current" signals, levels or thresholds that are within a controller and that represent current levels are not currents, but are voltages levels that represent currents within the controller.

In the embodiments described below, a quasi continuous mode buck-boost regulator is disclosed that uses hysteretic control. Both positive and negative regulated output voltages and inductor current are fed back to a controller to implement a hysteretic control algorithm. When regulated output voltage is sensed to be below a hysteretic voltage range, a latch is toggled and a high side and low side switches are turned on, resulting in increasing inductor current. Inductor current continues to ramp upward until it exceeds a hysteretic current range, at which time, one of the switches turns off. As a magnetic field within the inductor collapses, inductor current continues to flow, and is supplied via a rectifier element to a capacitor in one of two output circuits. The capacitor connects to a load and provides a regulated voltage to the load. With the rectifier element conducting, inductor current decays to a predefined lower hysteretic current level, which is greater than zero. If output voltage is still out of regulation, this process of inductor current increasing and decaying repeats quasi-continuously. Otherwise, inductor current decays to zero when the regulated voltage exceeds the hysteretic voltage range. In this manner, the regulator operates in a continuous conduction mode at heavy loads and in a discontinuous conduction mode at light loads.

Since a hysteretic control scheme is utilized, no additional circuitry required to guarantee loop stability. Further, the hysteretic controller provides excellent transient performance, with response time limited only by delays through controller logic elements. Rated output power can be delivered with appreciably lower peak inductor current than in the fixed frequency is discontinuous conduction mode case. Finally, pseudo-continuous mode switching frequency is readily controlled by the selected combination of inductor value and minimum/maximum inductor current. This disclosed hysteretic, quasi-continuous voltage regulator provides desired dual polarity output voltages that are useful in a data storage device as well as in other applications.

Figure 1:
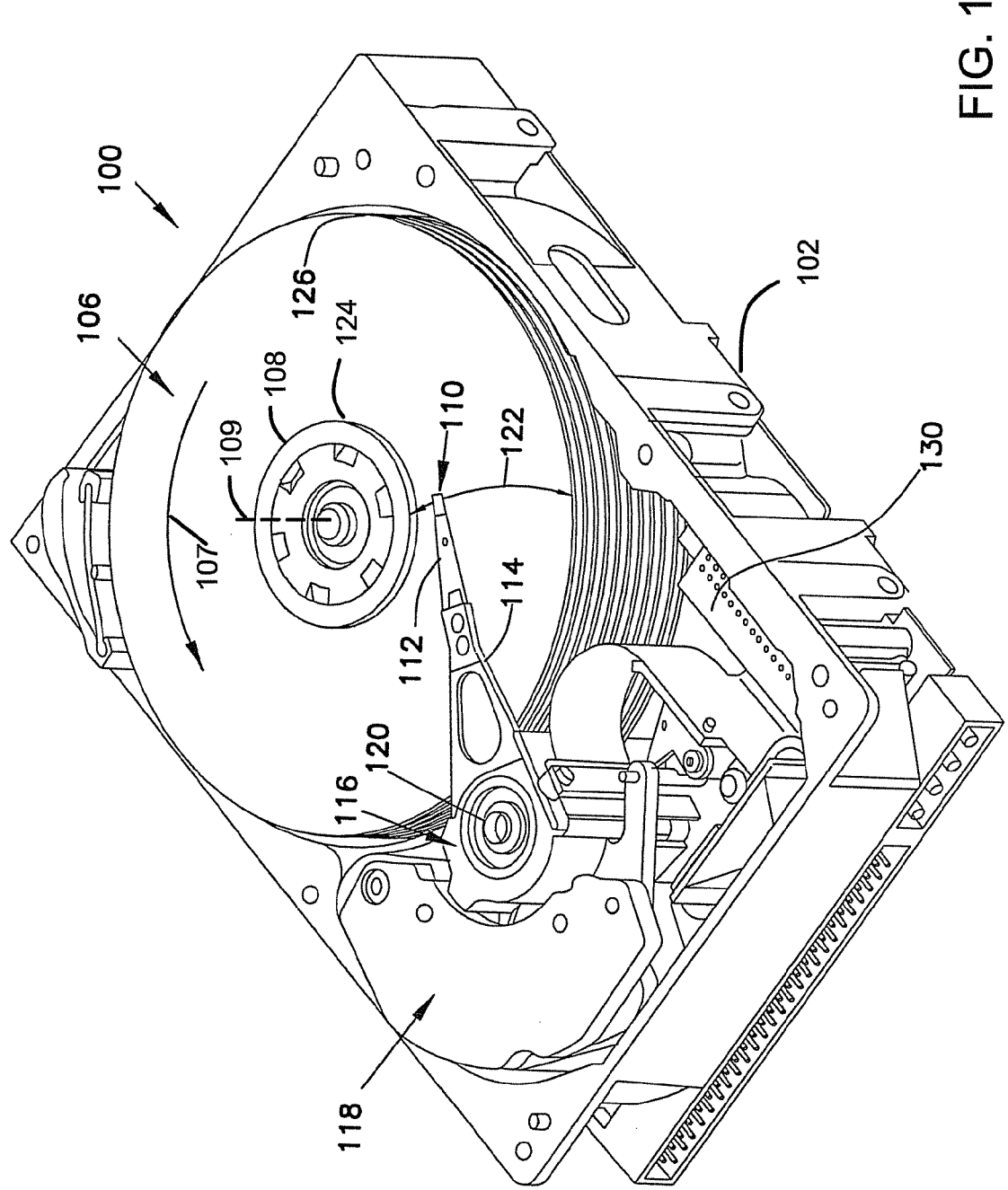
FIG. 1 illustrates an isometric view of a disc drive.

FIG. 1 is an isometric view of a disc drive 100 in which the presently disclosed voltage regulators and controllers are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about a central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

In the field of hard disk drives, the need for various regulated voltages is trending upward with the passage of time. As track pitch increases beyond 150 KTPI, meeting off-track budget becomes increasingly difficult. Piezo based micro-actuation has been identified as a means for addressing off-track budget, but incorporation of such methods requires a high positive voltage rail to obtain sufficient stroke from the micro-actuator system. Rail voltages of 24V, 28V, or higher have been proposed. In the 12V market space (desktop & server), such rail voltages may be obtained via a charge pump based tripler at the expense of efficiency and current driving capability. Assuming a VLSI based solution, the charge pump is also silicon intensive and requires numerous package pins to support the necessary flying and bucket capacitors. Alternately, an inductor based boost regulator along with its supporting external components may be utilized. In the 5V market space (mobile) an inductor based boost regulator provides the desired high voltage rail.

Hard disk drives also typically incorporate a differential pre-amplifier, which requires a regulated negative voltage bias. In order to deliver sufficient output power, an inductor based buck-boost regulator is often utilized in the 12V market space. Due to lower output power requirements, a charge pump based voltage inverter often proves sufficient in the 5V market space. In either case, dedicated control silicon, along with multiple VLSI package pins and external components, is necessary to support the preferred regulator architecture.

Finally, a positive regulated voltage is typically required to provide high-side FET gate bias for the spindle motor and voice coil motor half-bridge drivers. In both the 12V and 5V market spaces, this function has historically been provided by a charge pump based solution. Again, dedicated control silicon, device pins, and external components are necessary to incorporate this charge pump function.

Taken together, micro-actuator, pre-amplifier, and spindle/VCM driver voltage needs highlight several power system shortcomings:

1. High silicon content and numerous device pins in a VLSI implementation of a voltage regulator
2. Numerous external components that are not implemented in the VLSI circuit.
3. Relatively poor efficiency and/or transient response using historic regulation methods.

Figure 2:
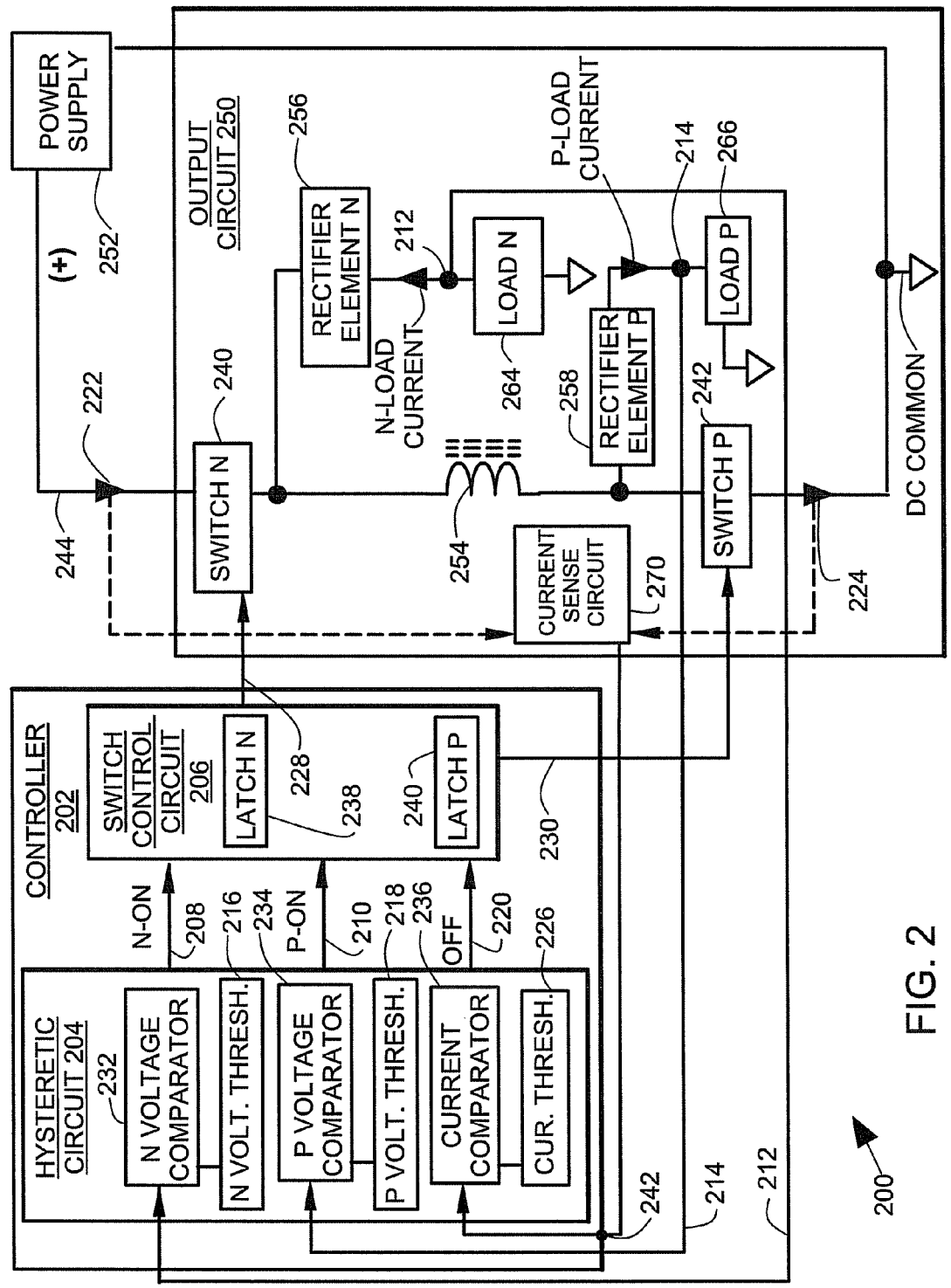
FIG. 2 illustrates a block diagram of a first dual polarity output voltage regulator.

FIG. 2 illustrates a voltage regulator 200 that can be used in a data storage device (such as disc drive 100 in FIG. 1) or in other devices. The voltage regulator 200 comprises a controller 202. The controller 202 comprises a hysteretic circuit 204 and a switch control circuit 206.

The voltage regulator 200 comprises an output circuit 250. The controller 202 controls switching of power supply current from a power supply 252 to an inductor 254 in the output circuit 250. The switching of the power supply current is performed by switches 240, 242 in the output circuit 250. Energy stored in the inductor 254 is rectified by rectifier elements 256, 258 in the output circuit 250 in order to produce regulated output voltages 212, 214 that have opposite polarities. The regulated output voltage 212 is negative and is provided to a load 264. The regulated output voltage 214 is positive and is provided to a load 266. First and second switch control outputs 228, 230 are provided to the respective first and second switches 240, 242 to separately regulate the first and second regulated voltages 212, 214.

The loads 264, 266 are power supply loads such as circuits in a data storage drive or other electronic device that requires regulated output voltages of opposite polarity. Either or both of the outgoing first and second regulated voltages 212, 214 can be boosted to a higher voltage amplitude than that of the incoming power supply voltage 244.

The hysteretic circuit 204 generates hysteretic voltage outputs 208, 210 as a function of regulated voltages at 212, 214. The hysteretic circuit 204 generates a hysteretic current output 220 (which is a voltage) as a function of a sensed inductor current at 222, 224. A current sense circuit 270 senses the inductor current at 222, 224 and provides an current sense output 242

The hysteretic circuit 204 provides a first ON level pulse at the output 208 and a second ON level pulse at the output 210 when corresponding first and second regulated voltages 212, 214 drop below respective first or second voltage thresholds 216, 218. The hysteretic circuit 204 provides an OFF level pulse at the output 220 when one of first and second switch currents 222, 224 increases above a current threshold 226. The controller 202 comprises a current sensor input pin coupled to current sense output 242 and the hysteretic circuit 204. The hysteretic circuit 204 comprises hysteretic comparators 232, 234, 236.

The switch control circuit 206 receives the first and second ON level pulses at the outputs 208, 210 and the OFF level pulse at the output 220. The switch control circuit 206 provides the first and second switch control outputs 228, 230 to separately regulate the first and second regulated voltages at 212, 214. The switch control circuit 206 comprises first and second latches 238, 240 that correspondingly control the first and second switch control outputs 228, 230.

The output circuit 250 provides the first and second regulated voltages 212, 214 having opposite polarities. The output circuit 250 comprises the first and second switches 240, 242 that switch the supply voltage 244 to the inductor 254 in the output circuit.

According to one aspect, the inductor 254 comprises a single two-terminal inductor, and the voltage regulator 200 does not include other inductors. According to another aspect, the inductor 254 comprises a ferrite core. According to another aspect, the inductor 254 comprises a cup core or toroidal core formed of soft magnetic material. According to another aspect, the rectifier elements 256, 258 comprise Schottky diodes. According to still further aspects, one or both rectifier elements 256, 258 comprise silicon diodes or field effect transistors. According to yet another aspect, the switches 240, 242 comprise field effect transistors.

Figure 3B:
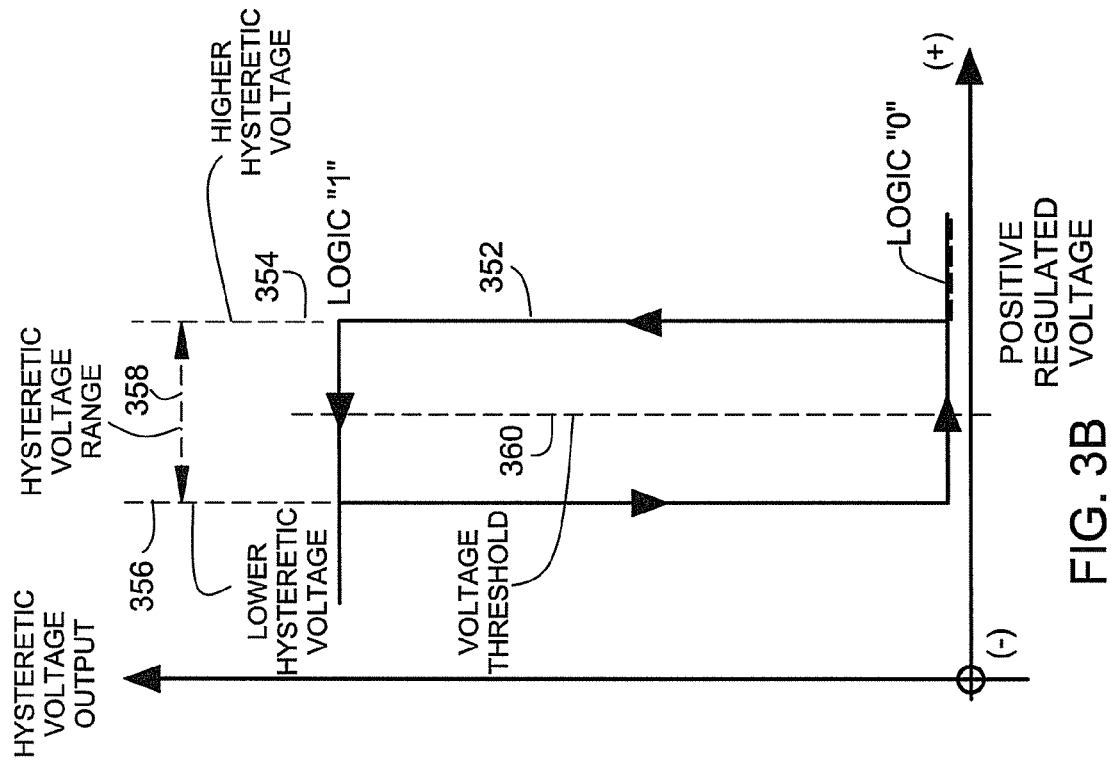
FIG. 3B illustrates a hysteresis loop that defines logic levels of positive voltage hysteretic output in FIG. 2.
Figure 3A:
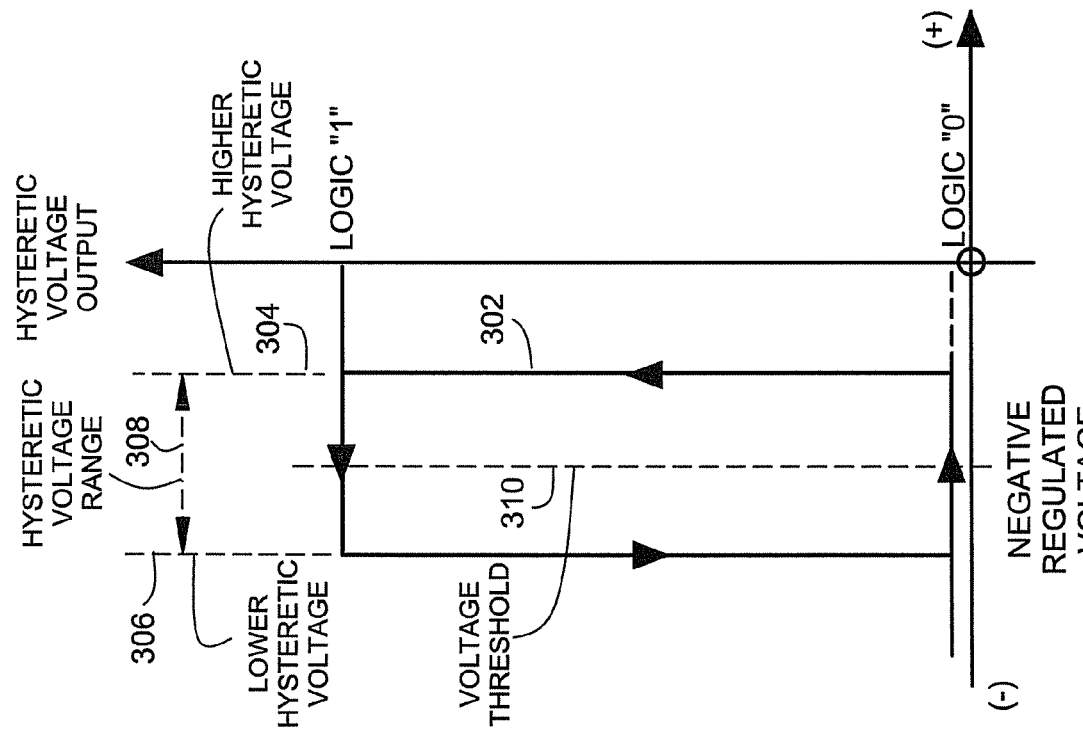
FIG. 3A illustrates a hysteresis loop that defines logic levels of a negative voltage hysteretic output in FIG. 2.

FIG. 3A illustrates a hysteresis loop 302 that defines logic levels "1" and "0" at the negative hysteretic voltage output (208 in FIG. 2) as a function of a regulated voltage (212 in FIG. 2). As the regulated voltage rises above a higher hysteretic voltage 304, the hysteretic voltage output changes to a "1" logic level, which starts a quasi-continuous mode of switch conduction. As the regulated voltage drops below a lower hysteretic voltage 306, the hysteretic voltage output changes to a "0" logic level, which stops the quasi-continuous mode. A hysteretic voltage range 308 from the lower hysteretic voltage 306 to the higher hysteretic voltage 304 defines a range of hysteretic regulation of the regulated voltage. The hysteresis loop 302 is approximately centered about a voltage threshold level 310 that is generated by a voltage threshold circuit (such as voltage threshold circuit 216 in FIG. 2).

FIG. 3B illustrates a hysteresis loop 352 that defines logic levels "1" and "0" at the positive hysteretic voltage output (210 in FIG. 2) as a function of a regulated voltage (214 in FIG. 2). As the regulated voltage falls below a lower hysteretic voltage 356, the hysteretic voltage output changes to a "1" logic level, which starts a quasi-continuous mode of switch conduction. As the regulated voltage rises above a higher hysteretic voltage 354, the hysteretic voltage output changes to a "0" logic level, which stops the quasi-continuous mode. A hysteretic voltage range 358 from the lower hysteretic voltage 356 to the higher hysteretic voltage 354 defines a range of hysteretic regulation of the regulated voltage. The hysteresis loop 352 is approximately centered about a voltage threshold level 360 that is generated by a voltage threshold circuit (such as voltage threshold circuit 218 in FIG. 2).

Figure 3C:
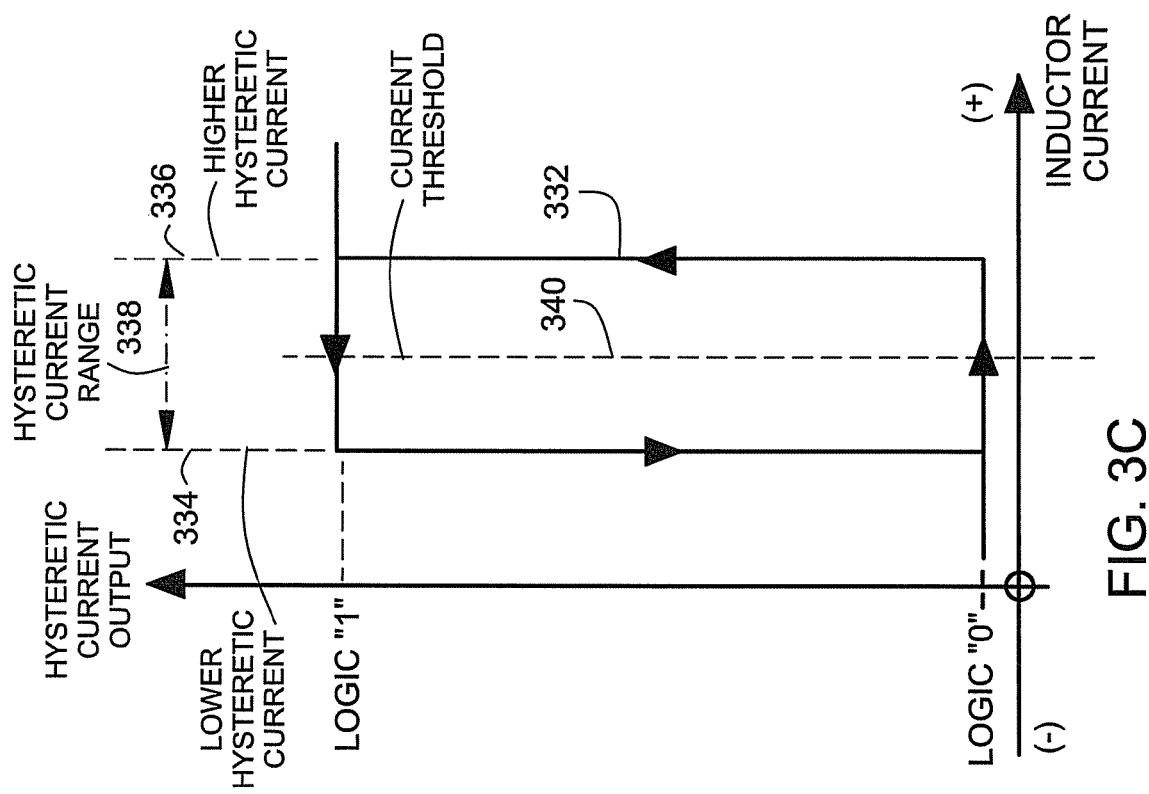
FIG. 3C illustrates a hysteresis loop that defines logic levels at the hysteretic current output in FIG. 2.

FIG. 3C illustrates a hysteresis loop 332 that defines logic levels "1" and "0" at the hysteretic current output 220 (FIG. 2) as a function of the inductor current (as sensed by current sense circuit 270 in FIG. 2). As the inductor current drops below a lower hysteretic current 334, the hysteretic current output 220 changes to a "0" logic level, which turns on switches 240, 242 to increase inductor current. As the inductor current rises above a higher hysteretic current 336, the hysteretic current output 220 changes to a "1" logic level, which shuts off a switch (such as switch 240 or 242 in FIG. 2) so that inductor current flows through a rectifier element (such as rectifier element 256 or 258 in FIG. 2) to a load (such as load 264 or 266 in FIG. 2). A hysteretic current range 338 from the higher hysteretic current 336 to the lower hysteretic current 334 defines a range of hysteretic regulation of the inductor current. The hysteresis loop 332 is approximately centered about a current threshold level 340 that is provided by the current threshold source 226.

The operation of the voltage regulator illustrated in FIGS. 2, 3A, 3B and 3C is described below in more detail below by way of an exemplary circuit shown in FIGS. 4-6.

Figure 4:
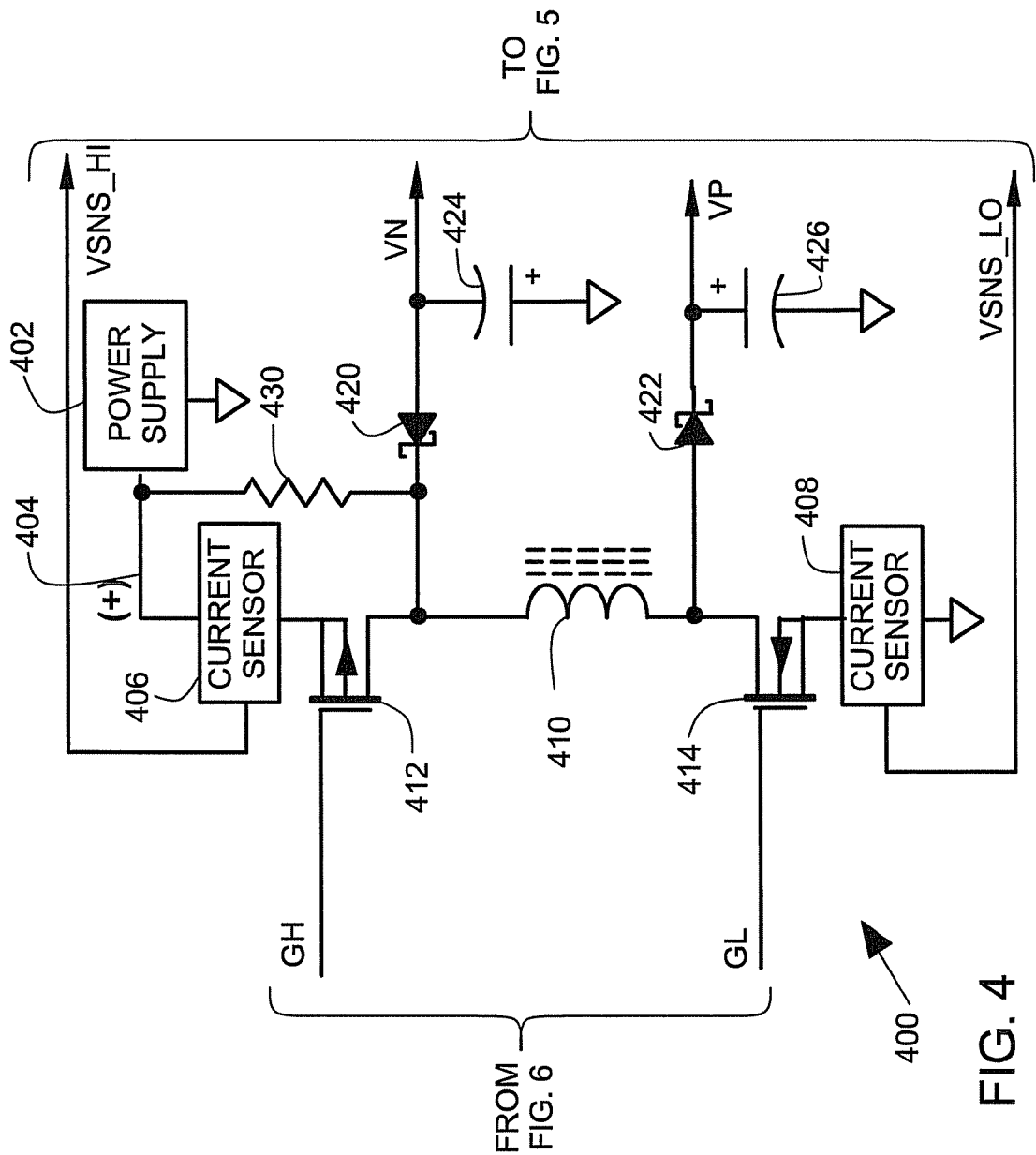
FIGS. 4-6 illustrate a simplified schematic of a second dual polarity output voltage regulator.
Figure 5:
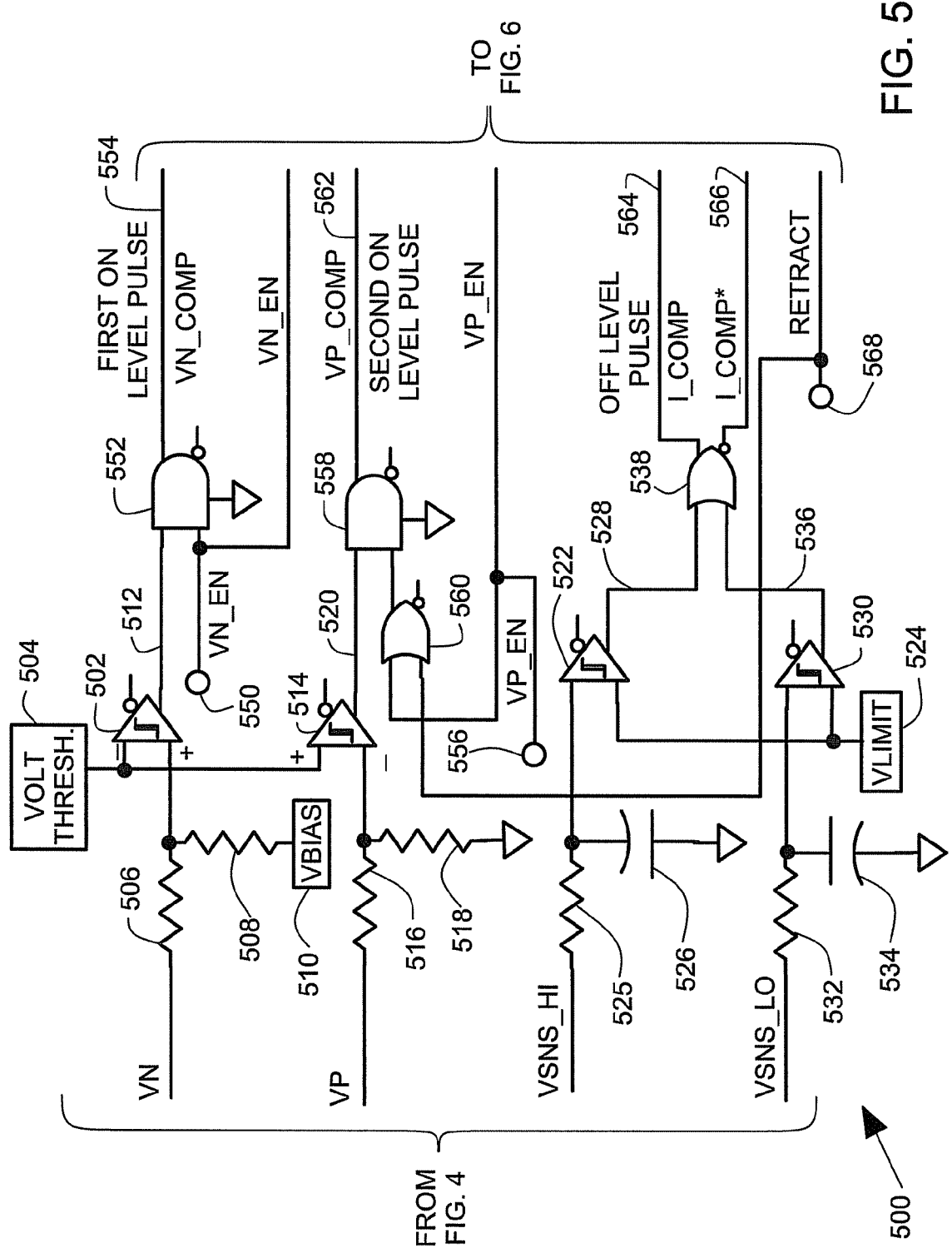
Figure 6:
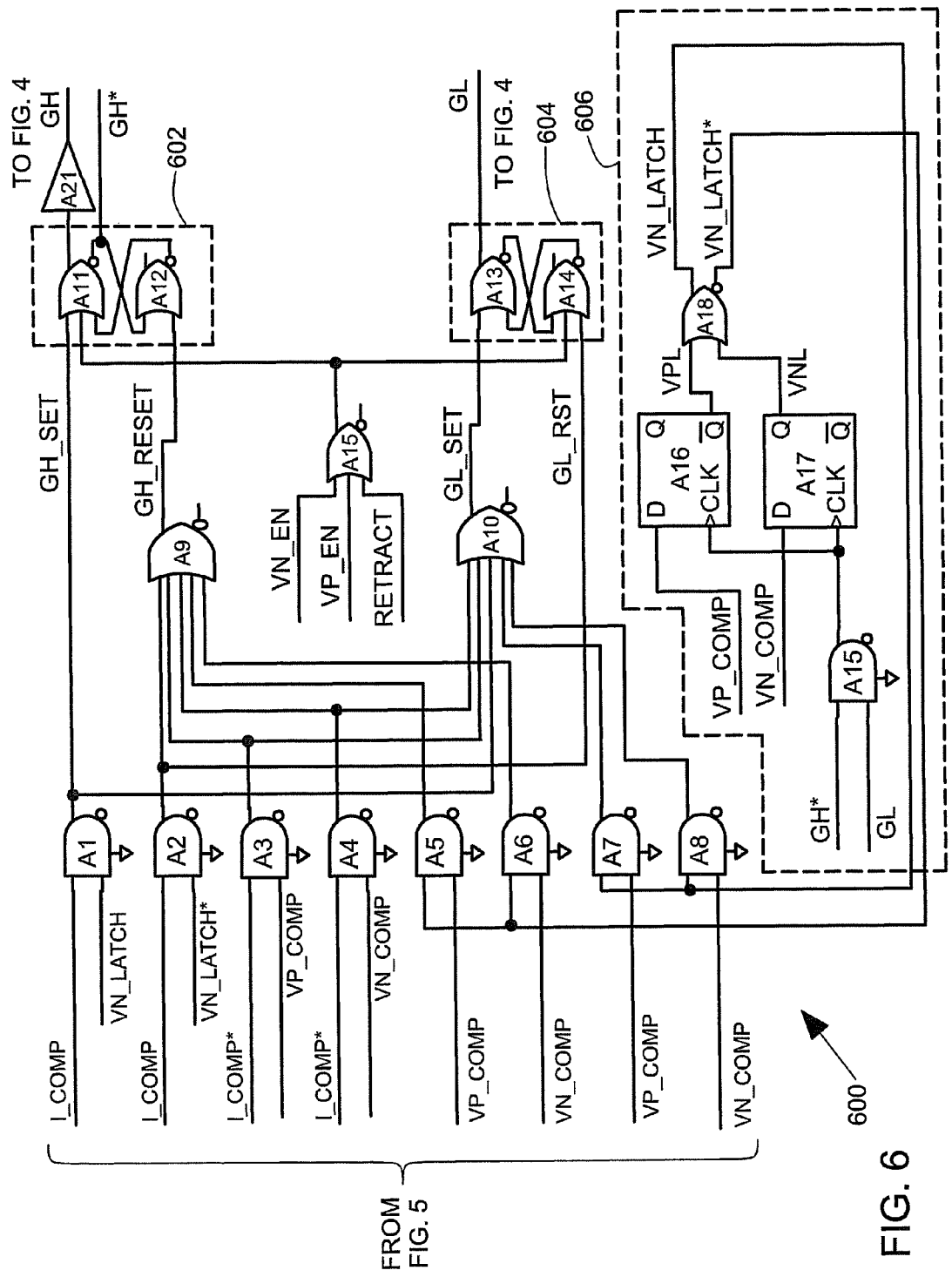

FIGS. 4-6 illustrate a simplified schematic of a dual polarity output voltage regulator. FIG. 4 illustrates an output circuit 400 of the dual polarity output voltage regulator. FIG. 5 illustrates a hysteretic circuit 500 of the dual polarity output voltage regulator. FIG. 6 illustrates a switch control circuit 600 of the dual polarity output voltage regulator.

In FIG. 4, the output circuit 400 is coupled to a power supply 402 that provides a supply voltage 404 that energizes the output circuit 400. The power supply 402 is typically part of a host computer to which a data storage device that includes the dual polarity output voltage regulator is connected.

The output circuit 400 comprises an inductor 410 that receives inductor current and that stores energy. The output circuit 400 comprises a first current sensor 406 that senses inductor current and that provides a first current sensor output VSNS_HI. The output circuit 400 comprises a second current sensor 408 that senses inductor current and that provides a second current sensor output VSNS_LO. The first and second current sensor outputs VSNS_HI and VSNS_LO couple to the hysteretic circuit 500 (FIG. 5).

The output circuit 400 comprises first and second switches 412, 414 that switch inductor current. As illustrated, the first and second switches comprise field effect transistors (FETs). Though high side P-channel and low side N-channel devices are shown, those skilled in the art will recognize that N-channel or P-channel devices may be utilized in either location along with an appropriate change in control logic polarity. The first switch 412 receives a first control input GH coupled to a gate of the first switch 412. The second switch 414 receives a second control input GL coupled to a gate of the second switch 414. Control inputs GH and GL are received from the switch control circuit 600 (FIG. 6). The first current sensor 406, the first switch 412, the inductor 410, the second switch 414, and the second current sensor 408 are connected in a series circuit with the power supply 402. The inductor 410 is first charged by closing both switches 412 and 414. The term "charge" refers to applying a voltage to the inductor 410 which causes inductor current to increase and which stores energy in the inductor 410.

When inductor 410 is charged to a desired level of energy storage, then a selected one of the switches 412, 414 is abruptly opened to discharge the energy stored in the inductor 410 through a selected one of rectifier elements 420, 422 into a selected one of the regulated voltage outputs VN or VP. A first storage capacitor 424 connected to regulated voltage VN receives energy if switch 412 is selected to be opened abruptly. A second storage capacitor 426 receives energy if switch 414 is selected to be opened abruptly. By separately controlling the control inputs GH and GL, the regulated output voltages VN and VP can be independently regulated. Regulated output voltages VN and VP couple to loads (such as loads 264, 266 in FIG. 2). Regulated output voltages VN and VP couple to the hysteretic circuit 500 in FIG. 5.

In FIG. 5, the hysteretic circuit 500 comprises a first hysteretic comparator 502 (also called a "Schmitt trigger" comparator). The first hysteretic comparator 502 receives a voltage threshold 504 at a first comparator input. The regulated output voltage VN (from FIG. 4) is coupled through a network of resistors 506, 508 to a second comparator input of the first hysteretic comparator 502. Selection of resistor values in the network of resistors 506, 508 scales the operation of the comparator to desired hysteretic voltage levels (as shown in FIG. 3A). The to regulated output voltage VN is a negative voltage and is outside the dynamic range of the second comparator input. A bias voltage VBIAS at 510 is coupled to resistor 508 in order to shift the voltage range at the second comparator input to be within the dynamic range of the second comparator input. The first hysteretic comparator 502 provides a hysteretic comparator output 512 that has hysteresis as discussed above in connection with FIG. 3A. The resistances of resistors 506, 508 are selected to provide a desired nominal regulation voltage for the regulated output voltage VN.

A second hysteretic comparator 514 receives the voltage threshold 504 at a first comparator input. The regulated output voltage VP (from FIG. 4) is coupled through a network of resistors 516, 518 to a second comparator input of the second hysteretic comparator 514. The regulated output voltage VP is a positive voltage. The second hysteretic comparator 514 provides a hysteretic comparator output 520 that has hysteresis as discussed above in connection with FIG. 3B. The resistances of resistors 516, 518 are selected to provide a desired nominal regulation voltage for the regulated output voltage VP.

A third hysteretic comparator 522 receives a voltage limit 524 at a first comparator input. The first current sensor output VSNS_HI (from FIG. 4) is coupled through a low pass filter of resistor 525 and capacitor 526 to a second comparator input of the third hysteretic comparator 522. The third hysteretic comparator 522 provides a hysteretic comparator output 528 that has hysteresis as discussed above in connection with FIG. 3C.

A fourth hysteretic comparator 530 receives the voltage limit 524 at a first comparator input. The second current sensor output VSNS_LO (from FIG. 4) is coupled through a low pass filter of resistor 532 and capacitor 534 to a second comparator input of the fourth hysteretic comparator 530. The fourth hysteretic comparator 530 provides a hysteretic comparator output 536 that has hysteresis as discussed above in connection with FIG. 3C.

The hysteretic comparator outputs 528 and 536 are combined by an OR gate 538 so that a pulse is provided when either current sensor 408 (FIG. 4) or current sensor 406 (FIG. 4) senses inductor current that is at a desired charge level limit that is set by VLIMIT 524. The OR gate 538 provides complementary outputs ICOMP and ICOMP* that comprise complementary OFF LEVEL PULSES on lines 564, 566.

The hysteretic comparator output 512 and an input VN_EN 550 are combined by an AND gate 552 to provide a first on level pulse VN_COMP on line 554. The hysteretic comparator output 520 and an input VP_EN 556 are combined by an AND gate 558 and an OR gate 560 to provide a second on level pulse VP_COMP on line 562. A RETRACT signal 568 is also applied to an input of OR gate 560 as illustrated.

The hysteretic comparator 502 senses negative output voltage VN, while the hysteretic comparator 514 senses positive output voltage VP. The hysteretic comparators 522 and 530 sense inductor current. A logical OR operation by OR gate 538 of the hysteretic comparator outputs 528, 536 provides continuous sensing of inductor current. The current sense hysteretic comparators 522, 530 employ hysteresis (as shown in FIG. 3C). The upper and lower hysteresis levels define minimum and maximum inductor current when operating in a pseudo-continuous conduction mode. The switches 412, 414 (FIG. 4) are preferably power MOSFETs. The switches 412, 414 are controlled based on voltage comparator (502, 514) output states and current comparator (522, 530) output states.

The high-side current sensor 406 provides VSNS_HI that mirrors current flowing through switch 412 to current comparator 522. Similarly, voltage VSNS_LO mirrors current flowing through switch 414 to current comparator 530.

The additional logic level inputs VN_EN at 550 and VP_EN at 556 are provided to allow for operation in boost, buck-boost, or combination boost/buck-boost mode. A logic level input RETRACT at 568 enables temporary continued operation in boost mode under power loss conditions. This operational mode ensures that a voice coil motor (VCM) driver can be driven to levels necessary for completion of retraction of heads from a data storage disc.

In the switch control circuit 600 in FIG. 6, outputs VN_COMP, VP_COMP, I_COMP and I_COMP* from FIG. 5 are coupled to inputs of AND gates A1-A8 as illustrated. Outputs of the AND gates A1-A8 are coupled to inputs of OR gates A9-A10 as illustrated.

A first latch 602 comprises NOR gates A11-A12 connected as a flip flop. An output GH_RESET of the OR gate A9 is coupled to the latch 602 as a reset input to the latch 602. An output GH_SET of the AND gate A1 is coupled to the latch 602 as a set input to the latch 602. A second latch 604 comprises NOR gates A13-A14 connected as a flip flop. An output GL_SET of the OR gate A10 is coupled to the latch 604 as a set input to the latch 604. An output GL_RST of the AND gate A2 is coupled to the latch 604 as a reset input to the latch 604. The outputs VN_EN, VP_EN and RETRACT (from FIG. 5) are coupled to inputs of an OR gate A15. An output of the OR gate A15 is coupled to both latches 602 and 604 as an initial state input to the latches 602 and 604.

Figure 7:
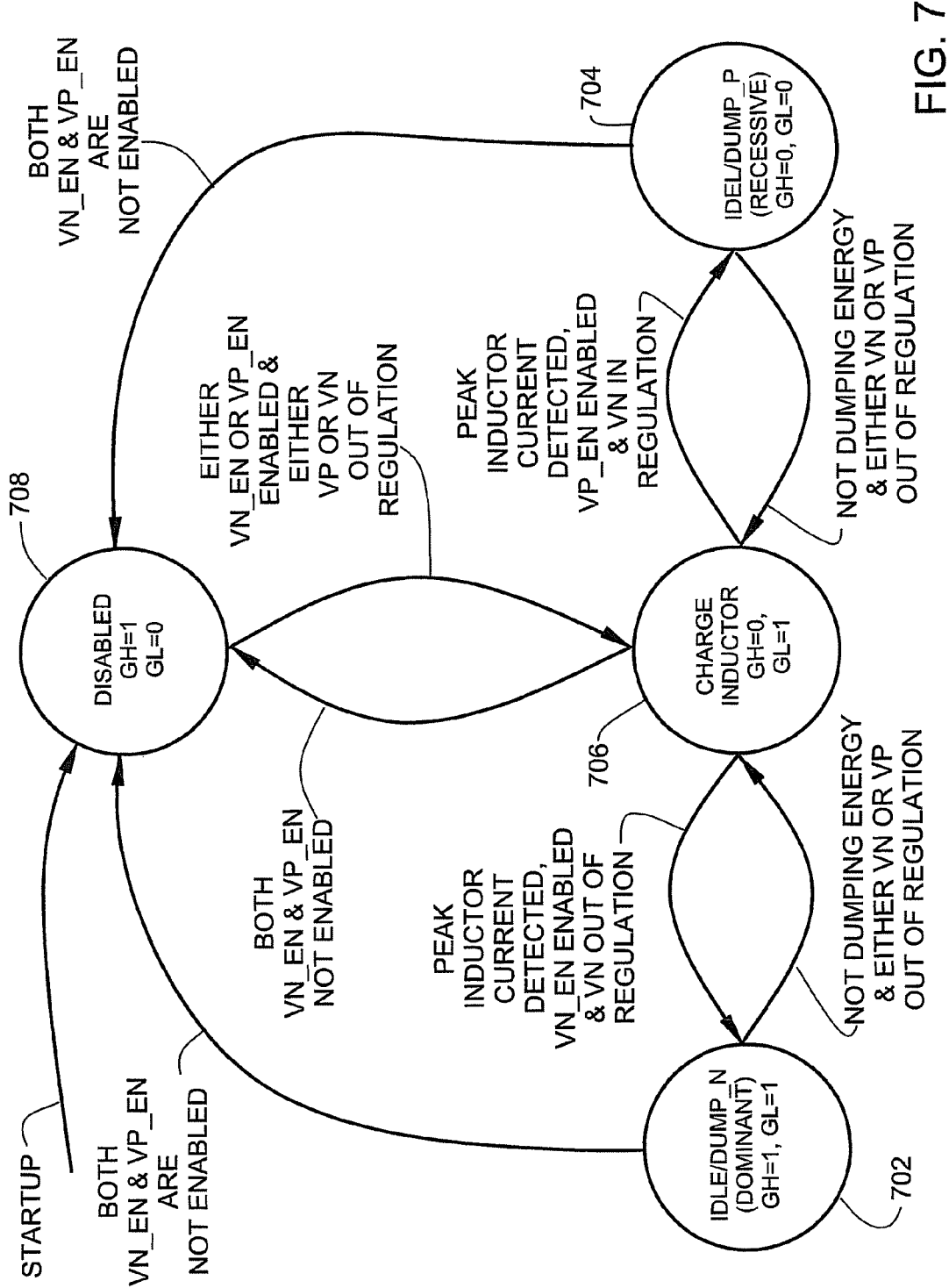
FIG. 7 illustrates a state diagram for the voltage regulator shown in FIGS. 4-6.

An output of the latch 602 is coupled to a buffer A21, and the output of the buffer A21 provides an output GH that couples to switch 412 FIG. 4. The latch 602 also provides an output GH*. An output of the latch 604 is an output GL that couples to switch 414 in FIG. 4. The latch 602 latches high-side gate drive level in response to changes in regulated voltage levels. Similarly, the latch 604 latches low-side gate drive level in response to changes in regulated voltage levels. Logic circuit 606 avoids direct transition from an IDLE/DUMP_N state (FIG. 7) to an IDLE/DUMP_P state (FIG. 7). Type D flip-flops A16-A17 perform this function by latching voltage comparator states at the beginning of each CHARGE cycle. These latched values remain persistent through the ensuing IDLE/DUMP_X cycle, preventing the undesired state transition.

At initial power application, VN_EN and VP_EN are inactive, as is the RETRACT input. Under these conditions, control logic is driven to a DISABLED state, with both switches 412, 414 (FIG. 4) turned off. Referring to FIG. 4, positive output voltage VP is precharged on capacitor 426 to the supply level 404 through resistor (Rboot) 430 at initial power application. Lacking this pre-charge mechanism, large inrush current would be observed when the positive regulator is subsequently enabled. The pre-charge resistor could alternatively be implemented using a transistor biased in the linear mode. In this fashion, the transistor could be turned off during normal operation to reduce system level power dissipation.

The circuitry in FIGS. 4-6 is exemplary and other circuitry can be used as well. According the one aspect, the switches 412, 414 can be bipolar transistors, field effect transistors or other switching elements. According to another aspect current sensing can be accomplished with sense resistors or solid state current sensors. Rectification may be performed by diodes (Schottky or silicon), or via synchronous rectification techniques that rely on switches. According to another aspect, the controller 202 can utilize asynchronous or synchronous controller logic. Various levels of input and output voltages can be used, depending on the particular application for the voltage regulator. The capacitor 426 can be referenced to conductor 404 rather than DC common. According to another aspect, either the positive or the negative regulator can be dominant. Various peak current detect/minimum off-time control schemes can be implemented.

FIG. 7 illustrates a state diagram for the voltage regulator shown in FIGS. 4-6. Hysteretic control techniques are used with both output voltage and inductor current fed back to implement the control algorithm. In effect, a hysteretic buck-boost regulator is cascaded with a hysteretic boost regulator, and the two switching elements 412, 414 (FIG. 4) are controlled in a fashion that forces one of the four system level states shown in the state diagram of FIG. 7.

The states include an IDLE/DUMP_N state 702 in which the high-side switch 412 is off, the low-side switch 414 is on, and energy is dumped to the negative polarity output voltage VN. The states include an IDLE/DUMP_P state 704 in which the high side switch 412 is on, the low-side switch 414 is off, and energy is dumped to positive polarity output VP.

The states include a CHARGE state 706 in which the high-side switch 412 is on, the low-side switch 414 is on, and the inductor is charged with increasing current. The states include a DISABLED state 708 in which the high-side and low-side switches 412, 414 are both off.

Depending on the relationship between negative regulator and positive regulator output power requirements, one regulator is made dominant and consumes the majority of switching cycles at rated load. The secondary regulator "steals" those switching cycles not required to service the primary output. For the specific example of hard disk drive applications, negative regulator output power necessary to bias the pre-amplifier is typically greater than positive regulator output power drawn by the micro-actuator system. In this case, the negative regulator is dominant and the positive regulator secondary.

When negative output voltage is sensed to be out of regulation, both switching elements are turned on (CHARGE state), resulting in increasing inductor current. Inductor current ramps upward until reaching a predefined current limit level, at which time, the high-side switch turns off (IDLE/DUMP_N state). As magnetic field within the inductor collapses, inductor current continues to flow, and is supplied to the negative regulator output capacitor and load via a rectifier element. With the rectifier element enabled, inductor current decays to a predefined minimum level, which is greater than zero. If negative output voltage remains out of regulation, the above process repeats. Otherwise, two courses of action are possible.

If positive output voltage VP is in regulation, inductor current decays to zero and the controller remains in the IDLE/DUMP_N state 702 until either output voltage VP or VN is sensed out of regulation. If, however, positive output voltage VP is out of regulation, both switching elements are turned on (CHARGE state 706). The controller remains in the CHARGE state 706 until inductor current reaches the predefined current limit level, when the low-side switch 414 is turned off (IDLE/DUMP_P state 704). Inductor current continues to flow through a rectifier element 422, supplying the positive regulator output and load. With the rectifier element 422 enabled, inductor current decays to the predefined minimum level. At this point, both output voltages VP and VN are sampled. If negative voltage VN is out of regulation, the negative output VN is serviced as described above. If negative voltage VN is in regulation, but positive voltage VP is out of regulation, the positive output VP is again serviced. If both voltages VN and VP are in regulation, inductor current decays to zero and the controller remains in the IDLE/DUMP_P state 704 until either output voltage VP or VN is again sensed out of regulation.

Logic 606 (FIG. 6) is used to ensure that control does not transfer directly from the IDLE/DUMP-N state 702 to the IDLE/DUMP-P state 704 without first transitioning through the CHARGE state 706. This undesired transition from state 702 to state 704 results in both switching elements changing state, and could cause race conditions depending on specific logic and switching element delays.

The functionality described provides regulated output voltages VP and VN for micro-actuator and pre-amplifier operation in a data storage drive. In the data storage drive, spindle/VCM driver high-side FET gate drive is provided by a linear regulator that steps positive voltage down to an appropriate level. DC current used to drive high-side gates is small such that the linear regulator imposes a negligible load on the positive supply rail. Linear regulator output voltage is chosen depending on VLSI process technology.

As a hysteretic control scheme is utilized, no special provisions are required to guarantee loop stability. Further, the hysteretic controller provides excellent transient performance, with response time limited only by circuit delays. Since the regulation system operates in pseudo-continuous conduction mode, rated output power may be delivered to both outputs with relatively low peak inductor current. Finally, pseudo continuous mode switching frequency is readily predicted by the selected combination of inductor value and minimum/maximum inductor current.

Figure 8:
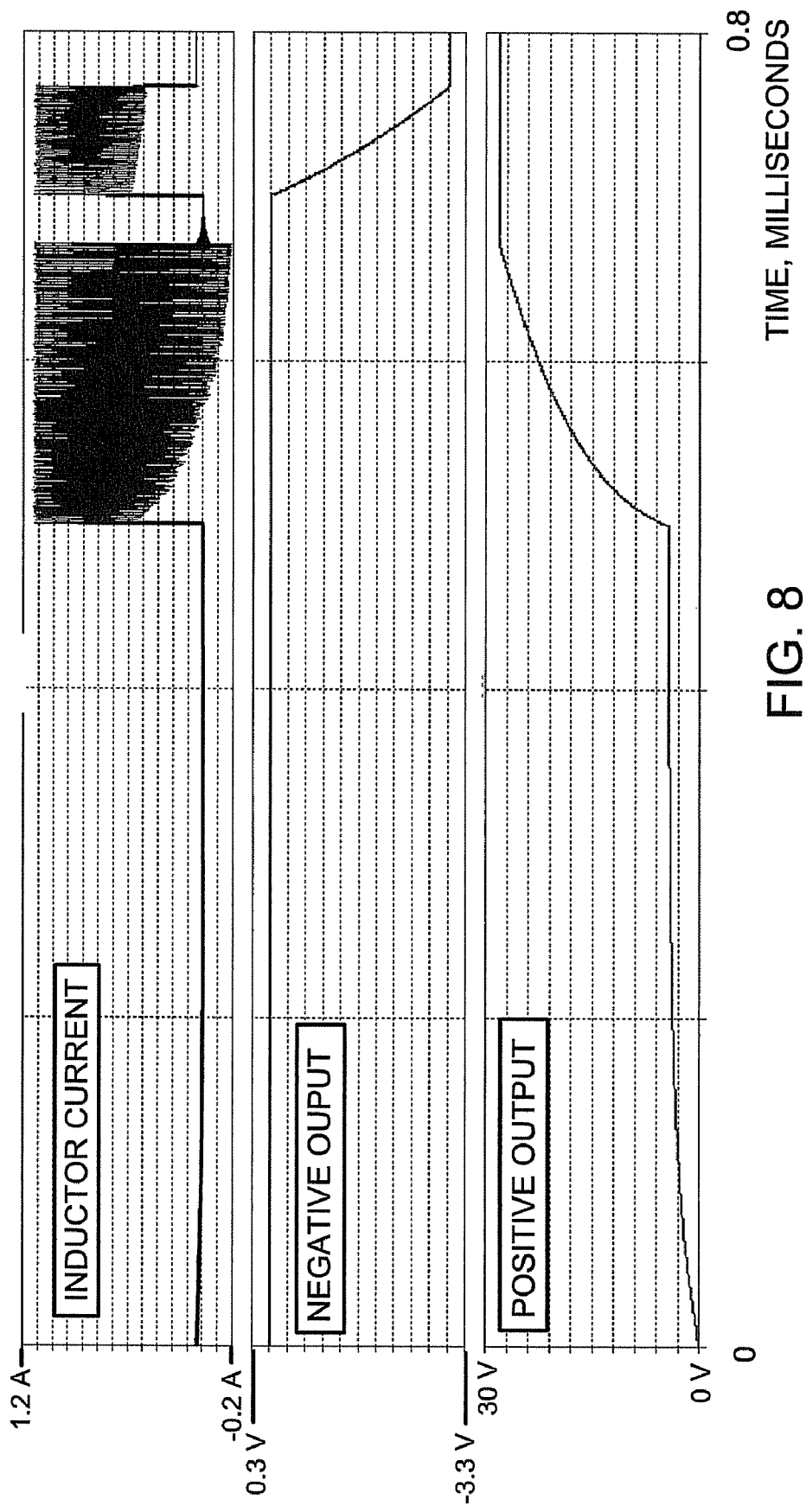
FIG. 8 illustrates a simulated soft start of the circuit of FIGS. 4-6.

FIG. 8 shows startup operation with the positive regulator enabled prior to the negative regulator. Since spindle/VCM high-side gate drive is derived from the positive rail, this would be the preferred startup sequence for a disk drive application (i.e. negative regulator not required until spindle motor at nominal speed). As described above, positive output is pulled to the supply through Rboot, preventing inrush current when the positive regulator is enabled. Note also that peak inductor current, as defined by current comparator upper hysteresis level, is well controlled over the entire startup duration.

Figure 9:
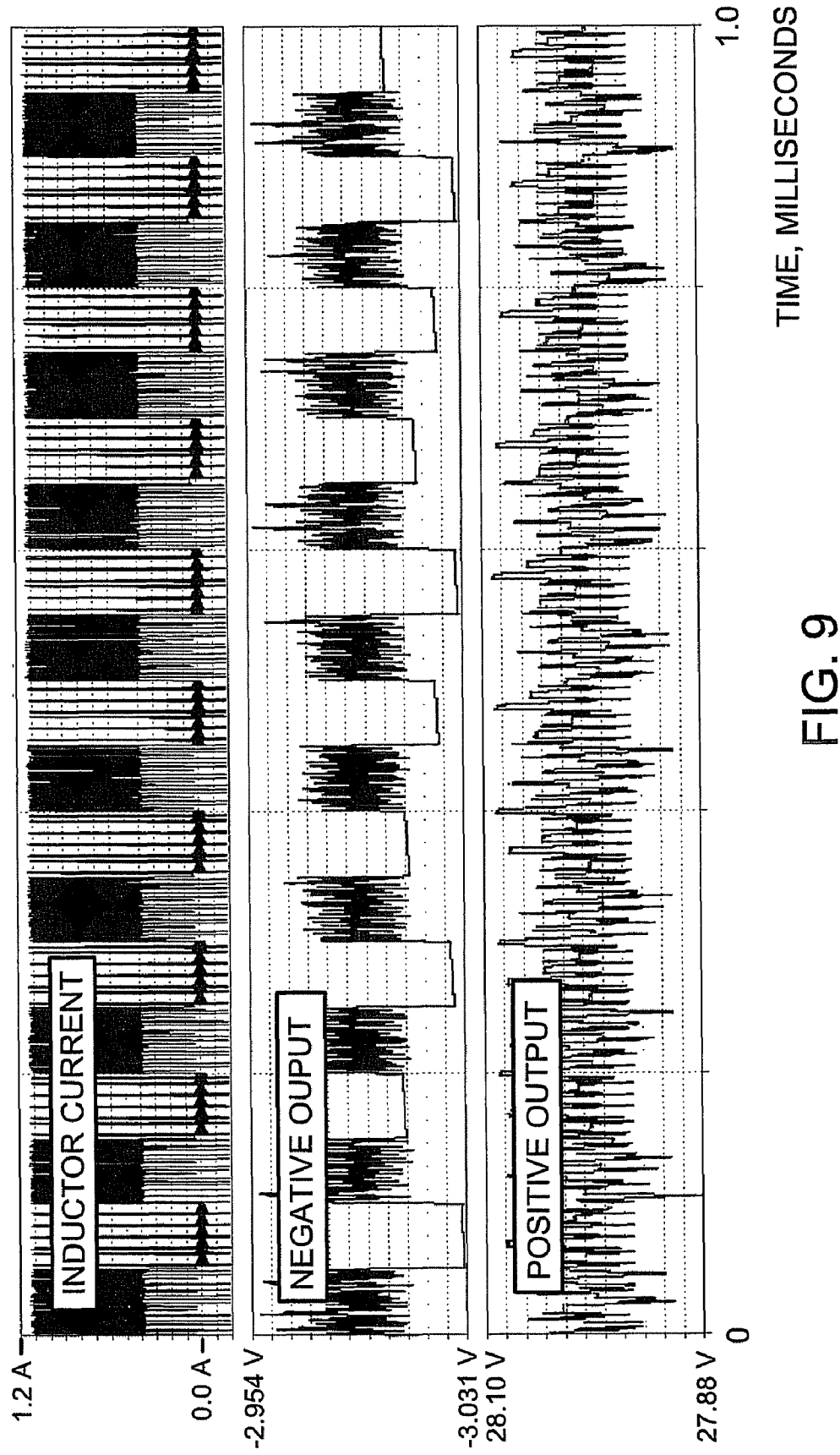
FIG. 9 illustrates a simulated transient performance of the circuit in FIGS. 4-6.
Figure 10:
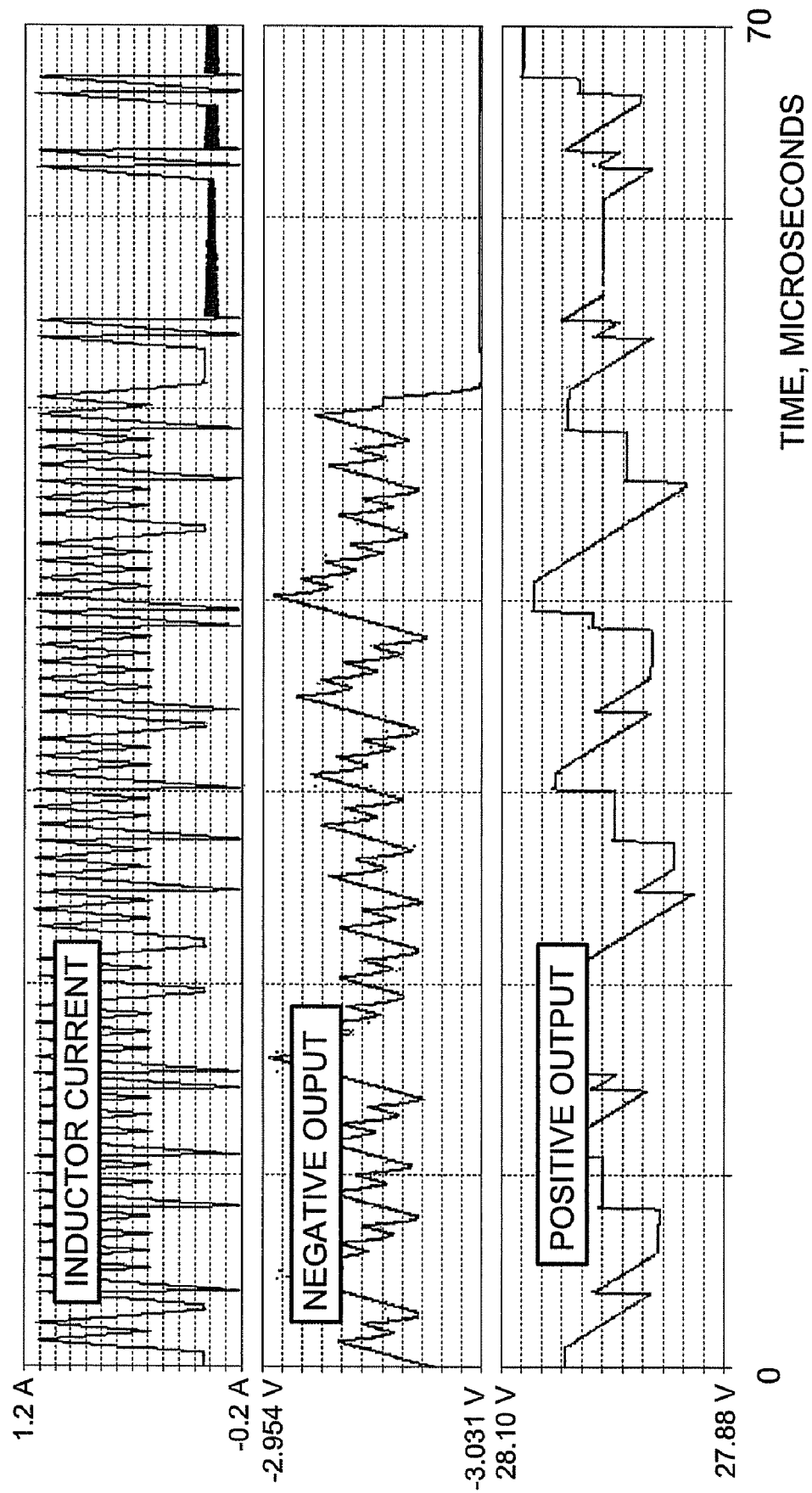
FIG. 10 illustrates an expanded view of the simulation waveforms in FIG. 9.

FIG. 9 shows transient response with both regulated outputs subjected to rated load conditions. Inductor value, current comparator reference level, and current comparator hysteresis settings were selected to deliver 250 mA continuous to a −3V negative output, and 15 mA continuous to a +28V positive output. FIG. 10 shows an expanded view of FIG. 9, with each of the IDLE/DUMP_N, CHARGE, and IDLE/DUMP_P states evident. Pseudo-continuous conduction mode operation is also apparent, and this mode of operation enables delivery of required output power with relatively low peak inductor current.

Figure 11B:
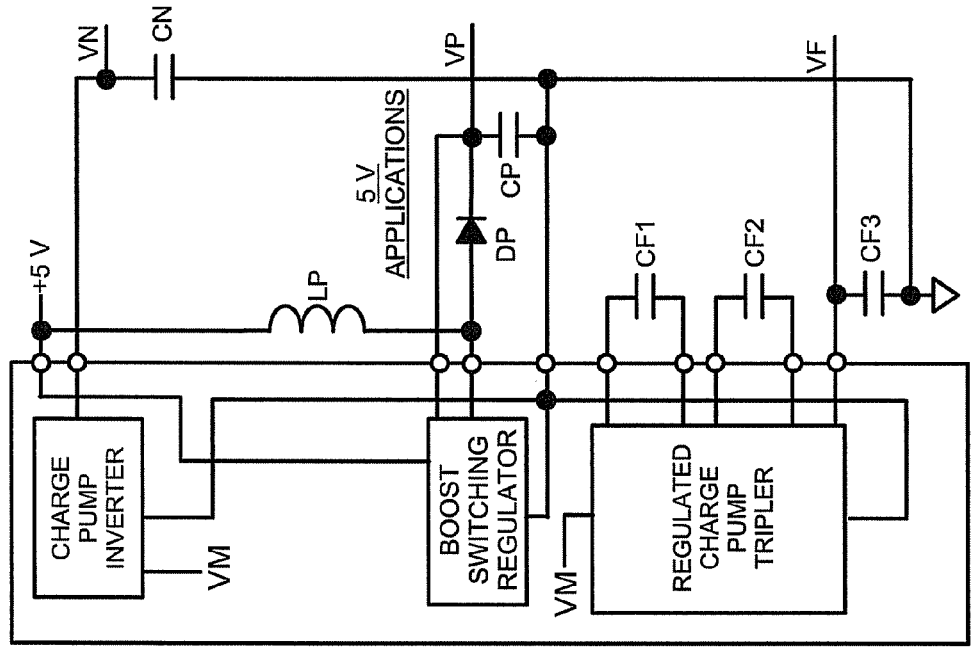
FIGS. 11A and 11B illustrate expected numbers of integrated circuit pins and external components in the absence of a dual polarity output voltage regulator in a data storage device.
Figure 11A:
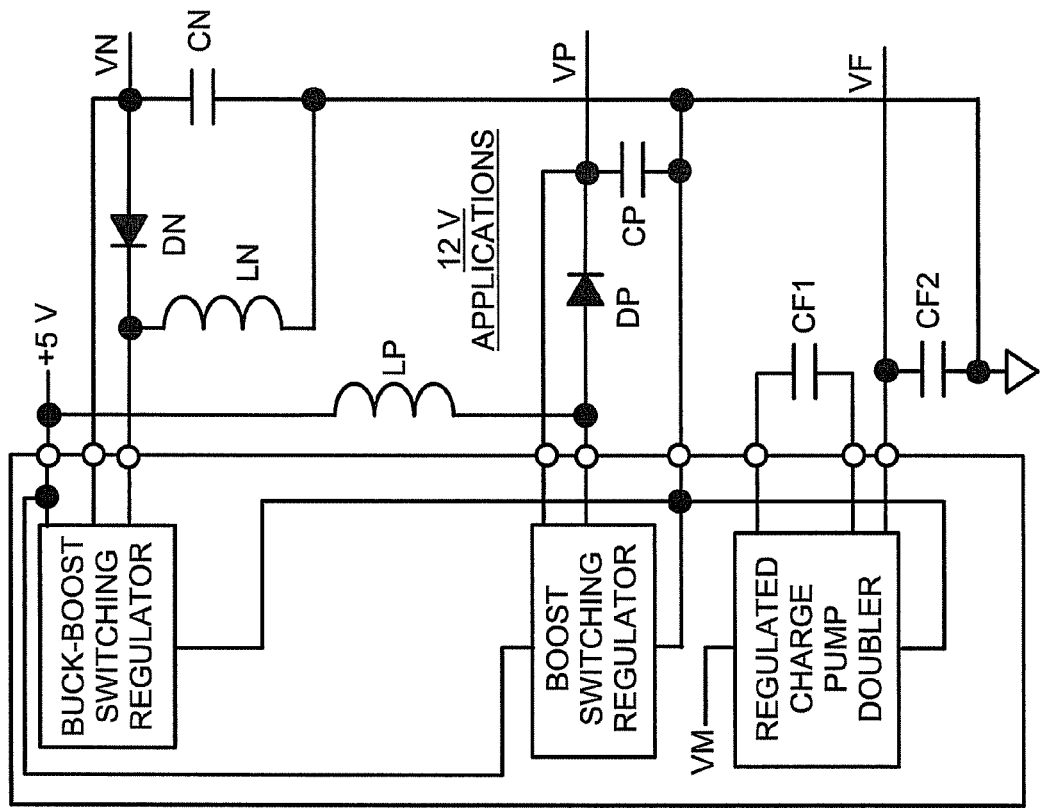
Figure 12:
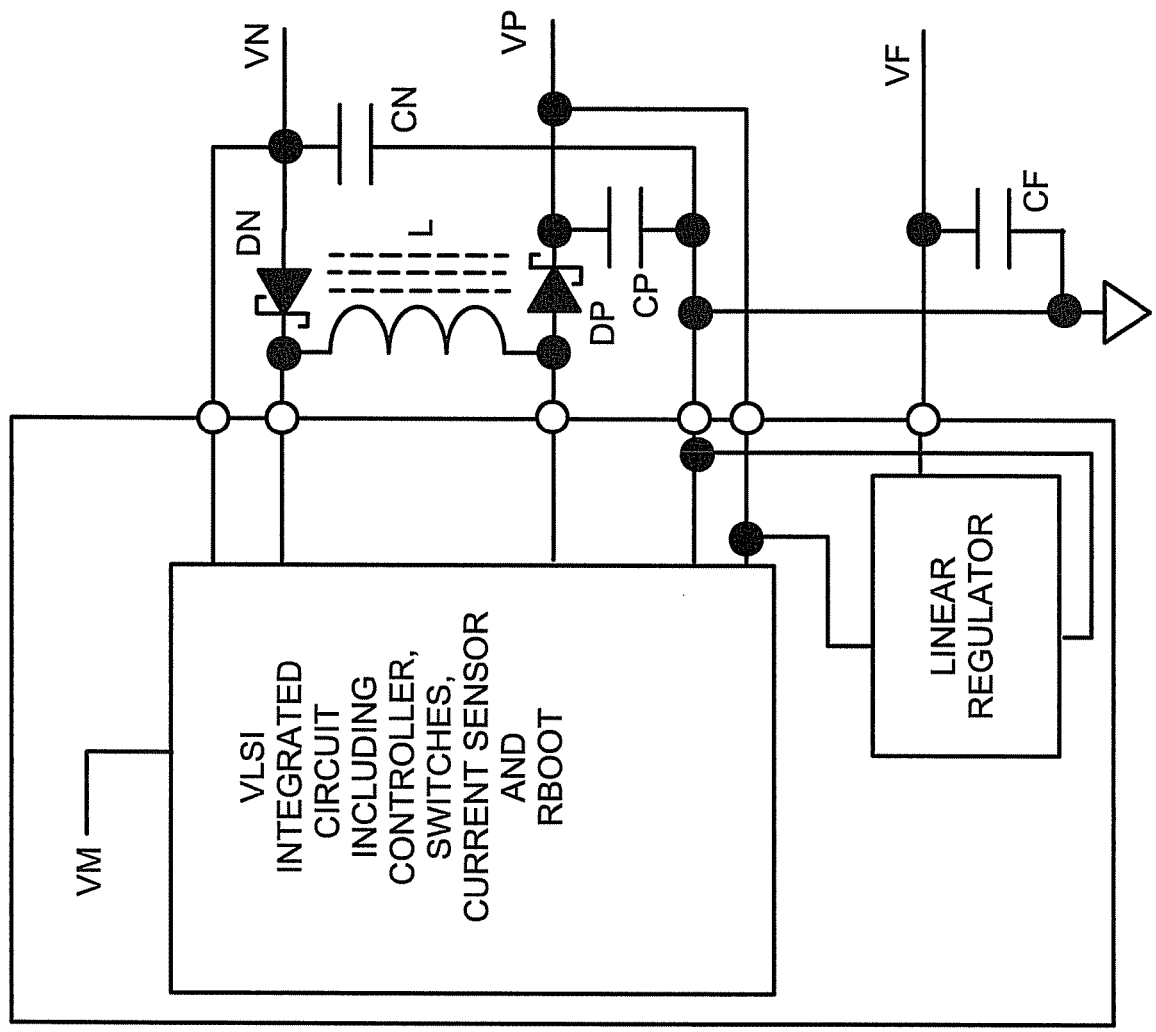
FIG. 12 illustrates numbers of integrated circuit pins and external components with the use of a dual polarity output voltage regulator in a data storage device. According to one aspect, the controller is part of an integrated circuit that controls a microactuator rail voltage, a preamplifier bias voltage and a spindle-VCM drive voltage.

FIGS. 11A and 11B summarize VLSI pin count and external component count for conventional disc drive regulators. IN FIG. 11A, which is representative of 12V desktop or enterprise hard disk drive applications, the VLSI circuitry requires 9 pins, and there are eight components that are external to the VLSI circuitry. In the 12V applications, the regulated charge pump doubler is energized by VM rather than +5V. VM is a node internal to the integrated circuit device that serves as a voice coil motor (VCM) and disc spindle driver voltage. The VM node is derived via an isolation field effect transistor (FET) conducting between the node VM and 12V. During normal operation, the isolation FET is turned on such that VM is approximately equal to the incoming supply voltage. Under power loss conditions, the isolation FET turns off and VM is driven to a level defined by rectified spindle motor back electromotive force (BEMF) voltage. In FIG. 11B, which is representative of 5V mobile hard disk drive applications, the VLSI circuitry requires 11 pins, and there are 8 components that are external to the VLSI circuitry. In the 5V case, negative voltage is generated via a regulated charge pump inverter In contrast, the presently disclosed disc drive regulator (included in FIG. 12) has a VLSI integrated circuit with only 6 pins and only 6 components that are external to the VLSI circuitry. In FIG. 12, the VLSI integrated circuit includes a dual polarity controller, switches, current sensor and Rboot (which can be a field effect transistor) as well as a linear regulator. Existing technology, assuming integrated switching elements and the addition of a dedicated micro-actuator power supply, is compared against the proposed scheme in both cases. Integrated rectifier elements would further reduce external component count. Pin count reduction provided by the proposed technique enables incorporation of additional features in the same VLSI package, while component reduction enables a smaller PCB footprint and lower system level cost.

Figure 13:
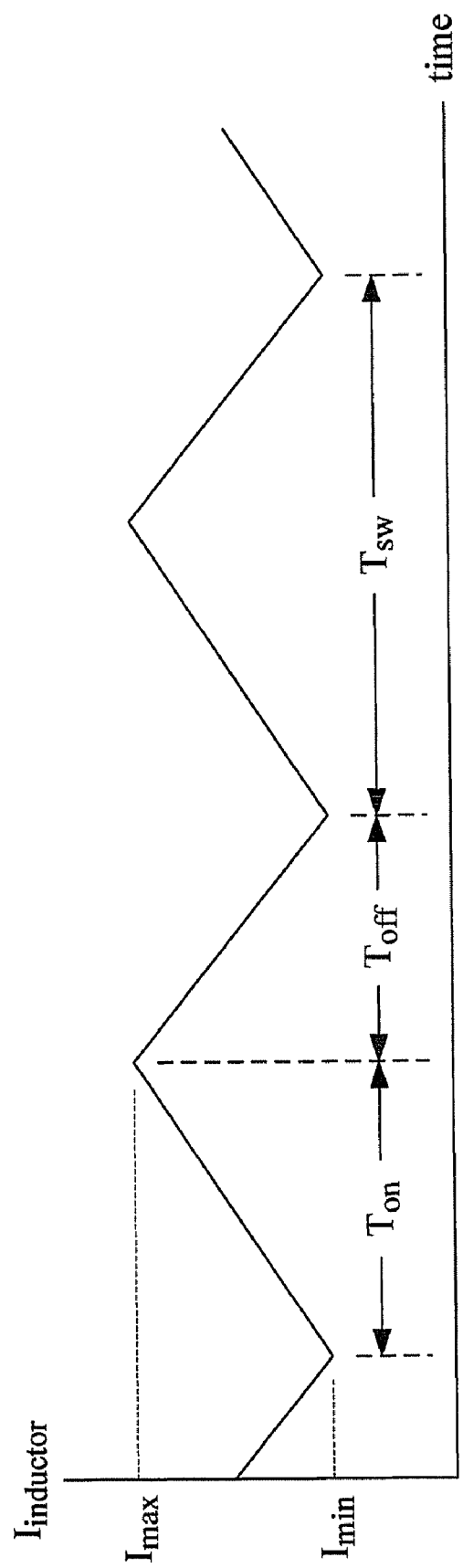
FIG. 13 illustrates a simplified timing diagram of inductor current in the disclosed voltage regulator.

For the circuits in FIGS. 4-6 operating in pseudo-continuous conduction mode, inductor current is as shown in the simplified timing diagram of FIG. 13. Neglecting circuit resistance, inductor current "i" is described by the relationship of Equation 1, where V is voltage imposed on the inductor and L is inductor value in Henrys.

$$V = L * \frac{di}{dt} \approx L * \frac{\Delta i}{\Delta t} \qquad \text{Eq. 1}$$

Substituting parameters and solving Equation 1 for off-time results in Equation 2, where it is understood that Vdiode is approximately 0.3V when using a Schottky diode as a rectification element. In the case of synchronous rectification, Vdiode is assumed negligible. As detailed in Equation 3, on-time may be estimated in a similar fashion. Finally, ideal switching period is estimated as the sum of on and off times.

In practical application, delay through the comparator, logic, and gate drive circuits is non zero, and this delay may be included to provide a more accurate switching period estimate. Switching element, inductor, and parasitic resistances may also be incorporated in the inductor current equation to produce a more refined estimate.

$$T_{off} \approx \frac{L*(I_{max} - I_{min})}{V_{out} + V_{diode}} = \frac{L*I_{ripple}}{V_{out} + V_{diode}} \qquad \text{Eq. 2}$$

$$T_{on} \approx \frac{L*I_{ripple}}{V_{supply}} \qquad \text{Eq. 3}$$

$$T_{sw} \approx T_{off} + T_{on} \qquad \text{Eq. 4}$$

It is to be understood that even though numerous characteristics and advantages of various aspects have been set forth in the foregoing description, together with details of the structure and function of various aspects, this disclosure is illustrative only, and changes may be made in detail, especially in matters of structure and arrangement of parts to the full extent indicated by the broad general meaning of the terms in which the appended claims are expressed. For example, the particular elements may vary depending on the particular application for the voltage regulator while maintaining substantially the same functionality. In addition, although the preferred aspects described herein are directed to a data storage device for connection to a computer, it will be appreciated by those skilled in the art that the teachings herein can be applied to voltage regulator for other applications without departing from the scope of the present invention.

What is claimed is:

1. A controller, comprising:
a hysteretic circuit that provides a first ON level pulse when a corresponding first negative regulated voltage rises above a respective first voltage threshold; the hysteretic circuit providing a second ON level pulse when a corresponding second positive regulated voltage drops below a respective second voltage threshold; the hysteretic circuit providing an OFF level pulse when one of first and second switch currents increases above a current threshold.

2. The controller of claim 1, comprising:
a switch control circuit that receives the first and second ON level pulses and the OFF level pulse and that provides first and second switch control outputs to separately regulate the first and second regulated voltages.

3. The controller of claim 2 wherein the hysteretic circuit comprises a voltage threshold coupled to at least one hysteretic voltage comparator.

4. The controller of claim 2 wherein the hysteretic circuit comprises a current threshold coupled to a hysteretic current comparator.

5. The controller of claim 2 wherein the switch control circuit comprises first and second latches that correspondingly control the first and second switch control outputs.

6. The controller of claim 2 wherein the switch control circuit comprises a retract input that controls the switch control circuit to maintain the second output in regulation under power loss conditions.

7. The controller of claim 2 further comprising at least one current sensor input coupled to the hysteretic circuit.

8. The controller of claim 2 wherein the controller is part of an integrated circuit that controls a microactuator rail voltage, a preamplifier bias voltage and a spindle-VCM drive voltage.

9. A voltage regulator comprising:
an output circuit that provides first and second regulated voltages having opposite polarities, the output circuit comprising first and second switches that switch a supply voltage to an inductor in the output circuit;
a hysteretic circuit that provides a first ON level pulse when a corresponding first negative regulated voltage rises above a respective first voltage threshold; the hysteretic circuit providing a second ON level pulse when a corresponding second positive regulated voltage drops below a respective second voltage threshold; the hysteretic circuit providing an OFF level pulse when one of first and second switch currents increases above a current threshold.

10. The voltage regulator of claim 9, comprising:
a switch control circuit that receives the first and second ON level pulses and the OFF level pulse and that provides first and second switch control outputs to the first and second switches to separately regulate the first and second regulated voltages.

11. The voltage regulator of claim 10 wherein the inductor comprises a single two-terminal inductor, and the voltage regulator does not include other inductors.

12. The voltage regulator of claim 10 wherein the output circuit comprises a capacitor and a rectifier element that rectifies current that flows between the inductor and the capacitor.

13. The voltage regulator of claim 12 wherein the rectifier element comprises a Schottky diode.

14. The voltage regulator of claim 13 wherein the output circuit comprises a second capacitor and a second Schottky diode.

15. The voltage regulator of claim 12 wherein the switches comprise field effect transistors.

16. A method of a voltage regulation, comprising:
coupling a first polarity supply voltage to an inductor through first and second switches to deliver first and second switch currents to the inductor;
generating first and second opposite polarity regulated voltages from energy stored in the inductor by the first and second switch currents;
generating a first hysteretic ON level pulse when the corresponding first regulated voltage rises above a respective first voltage threshold, and generating a hysteretic OFF level pulse when one of the first and second switch currents increases above a current threshold; and
generating a second hysteretic ON level pulse when the corresponding second positive regulated voltage drops below a respective second voltage threshold, and generating a hysteretic OFF level pulse when one of the first and second switch currents increases above a current threshold; and providing first and second switch control outputs to the respective first and second switches to separately regulate the first and second regulated voltages.

17. The method of claim 16, comprising:

shutting off the first switch when the first negative regulated voltage falls below a lower hysteretic voltage.

18. The method of claim 16, comprising:

shutting off the second switch when the second positive regulated voltage rises above a higher hysteretic voltage.

19. The method of claim 16, comprising:

asynchronously controlling the quasi-continuous control output.

20. The method of claim 16, comprising:

synchronously controlling the quasi-continuous control output.

* * * * *